US012055453B2

(12) United States Patent
Mitani et al.

(10) Patent No.: US 12,055,453 B2
(45) Date of Patent: Aug. 6, 2024

(54) STRESS ESTIMATION METHOD FOR MACHINE STRUCTURE AND MONITORING METHOD FOR MACHINE STRUCTURE

(71) Applicants: KABUSHIKI KAISHA TOSHIBA, Tokyo (JP); Toshiba Energy Systems & Solutions Corporation, Kawasaki (JP)

(72) Inventors: Jun Mitani, Yokohama Kanagawa (JP); Takero Mukai, Yokohama Kanagawa (JP); Takanobu Kojima, Yokohama Kanagawa (JP); Masahiko Nakazono, Kawasaki Kanagawa (JP)

(73) Assignees: Kabushiki Kaisha Toshiba, Tokyo (JP); Toshiba Energy Systems & Solutions Corporation, Kawasaki (JP)

( * ) Notice: Subject to any disclaimer, the term of this patent is extended or adjusted under 35 U.S.C. 154(b) by 0 days.

(21) Appl. No.: 17/930,024

(22) Filed: Sep. 6, 2022

(65) Prior Publication Data

US 2023/0084695 A1 Mar. 16, 2023

(30) Foreign Application Priority Data

Sep. 15, 2021 (JP) ................... 2021-150458

(51) Int. Cl.
*G01L 23/08* (2006.01)
*G01L 1/02* (2006.01)
(Continued)

(52) U.S. Cl.
CPC ............... *G01L 23/08* (2013.01); *G01L 1/02* (2013.01); *G01L 1/103* (2013.01); *G01L 1/106* (2013.01);
(Continued)

(58) Field of Classification Search
CPC ......... G01L 1/255; G01L 1/167; G01L 1/165; G01L 1/162; G01L 1/16; G01L 1/106;
(Continued)

(56) References Cited

U.S. PATENT DOCUMENTS

2002/0162394 A1* 11/2002 Loftus .................... G01H 1/006
73/660
2005/0172720 A1 8/2005 Schmitt-Thomas
(Continued)

FOREIGN PATENT DOCUMENTS

JP         H5-11895 A      1/1993
JP     2005-148064 A      6/2005
(Continued)

*Primary Examiner* — Paul M. West
(74) *Attorney, Agent, or Firm* — Finnegan, Henderson, Farabow, Garrett & Dunner, LLP (57) ABSTRACT

A stress estimation method for a machine structure according to an embodiment is provided with a calculation step of calculating a relationship between the stress generated at the evaluation target position and a physical quantity including a sound pressure or vibration generated at a detection position different from the evaluation target position during vibration of the machine structure. The stress estimation method for a machine structure is provided with a detection step of detecting the physical quantity generated at the detection position during operation of the machine structure. The stress estimation method for a machine structure is provided with an estimation step of estimating the stress generated at the evaluation target position during operation of the machine structure on the basis of the relationship calculated in the calculation step and the physical quantity detected in the detection step.

10 Claims, 3 Drawing Sheets

(51) Int. Cl.
  *G01L 1/10* (2006.01)
  *G01L 1/16* (2006.01)
  *G01L 1/25* (2006.01)

(52) U.S. Cl.
  CPC .............. *G01L 1/162* (2013.01); *G01L 1/165* (2013.01); *G01L 1/167* (2013.01); *G01L 1/255* (2013.01)

(58) Field of Classification Search
  CPC ............. G01L 1/103; G01L 1/10; G01L 1/02; G01L 23/08; G01M 5/0066; G01M 13/045
  See application file for complete search history.

(56) References Cited

U.S. PATENT DOCUMENTS

| | | |
|---|---|---|
| 2014/0195184 A1 | 7/2014 | Maeda et al. |
| 2019/0145761 A1* | 5/2019 | Ziegler ................... G01B 11/26 356/138 |
| 2021/0115898 A1* | 4/2021 | Messing ................... F03D 9/25 |

FOREIGN PATENT DOCUMENTS

| | | |
|---|---|---|
| JP | 2013-41448 A | 2/2013 |
| JP | 2014-70976 A | 4/2014 |
| JP | 5808605 B2 | 11/2015 |

* cited by examiner

STRESS ESTIMATION METHOD FOR MACHINE STRUCTURE AND MONITORING METHOD FOR MACHINE STRUCTURE

CROSS-REFERENCE TO RELATED APPLICATION

This application is based upon and claims the benefit of priority from Japanese Patent Application No. 2021-150458, filed on Sep. 15, 2021; and the entire contents of which are incorporated herein by reference.

FIELD

Embodiments described herein relate generally to a stress estimation method for a machine structure and a monitoring method for a machine structure.

BACKGROUND

Typically, stress generated at an evaluation target position in a machine structure can be determined by carrying out measurement with a stress sensor such as a strain gauge attached to the evaluation target position. However, during operation of the machine structure, it may be difficult to attach the stress sensor to the evaluation target position. In addition, it may be necessary to shut down the operation of the machine structure in order to attach the stress sensor to the machine structure, and an opportunity loss may occur due to the shutdown.

For example, let us assume that the machine structure is a waterwheel structure such as a Francis turbine, and stress generated in runner blades during operation of the waterwheel structure is to be measured in order to determine the state of the runner blades of a runner during the operation of the waterwheel structure. In this case, since the runner is a part that rotates at a high speed in response to pressure from flowing water during operation of the waterwheel structure, it is difficult to attach a stress sensor to the runner blades. In addition, even if the stress sensor is to be attached, it is necessary to shut down the operation of the waterwheel structure in order to attach the stress sensor to the runner blades. More specifically, after shutting down the operation of the waterwheel structure and draining the water out of the waterwheel structure, it is required to remove the upper cover and hang the runner out together with a main shaft, or a worker needs to enter the waterwheel structure from a maintenance hole provided on a casing or a draft tube for an attaching operation of the stress sensor. As a result, the operation shutdown period of the waterwheel structure is extended and the maintenance/inspection work of the waterwheel structure increases, whereby an opportunity loss may occur due to the operation shutdown of the waterwheel structure.

DETAILED DESCRIPTION

A stress estimation method for a machine structure according to an embodiment is a method of estimating stress generated at an evaluation target position in the machine structure during operation of the machine structure. The stress estimation method for a machine structure is provided with a calculation step of calculating a relationship between the stress generated at the evaluation target position and a physical quantity including a sound pressure or vibration generated at a detection position different from the evaluation target position during vibration of the machine structure. The stress estimation method for a machine structure is provided with a detection step of detecting the physical quantity generated at the detection position during operation of the machine structure. The stress estimation method for a machine structure is provided with an estimation step of estimating the stress generated at the evaluation target position during operation of the machine structure on the basis of the relationship calculated in the calculation step and the physical quantity detected in the detection step.

A monitoring method for a machine structure according to an embodiment is a method of monitoring a state of an evaluation target position in the machine structure during operation of the machine structure. The monitoring method for a machine structure is provided with a calculation step of calculating a relationship between the stress generated at the evaluation target position and a physical quantity including a sound pressure or vibration generated at a detection position different from the evaluation target position during vibration of the machine structure. The monitoring method for a machine structure is provided with a determination step of determining a notification threshold value of the physical quantity during operation of the machine structure on the basis of the relationship calculated in the calculation step and allowable stress of the evaluation target position having been set. The monitoring method for a machine structure is provided with a detection step of detecting the physical quantity generated at the detection position during operation of the machine structure, and a notification step of notifying that the physical quantity detected in the detection step has exceeded the notification threshold value.

Hereinafter, the stress estimation method for a machine structure and the monitoring method for a machine structure according to the embodiments of the present invention are described with reference to the drawings.

First Embodiment

First, a waterwheel structure, particularly a Francis turbine, which is an example of a machine structure according to the present embodiment is described with reference to FIGS. 1 and 2. Hereinafter, a description is given according to a flow of water during turbine operation.

Figure 1:
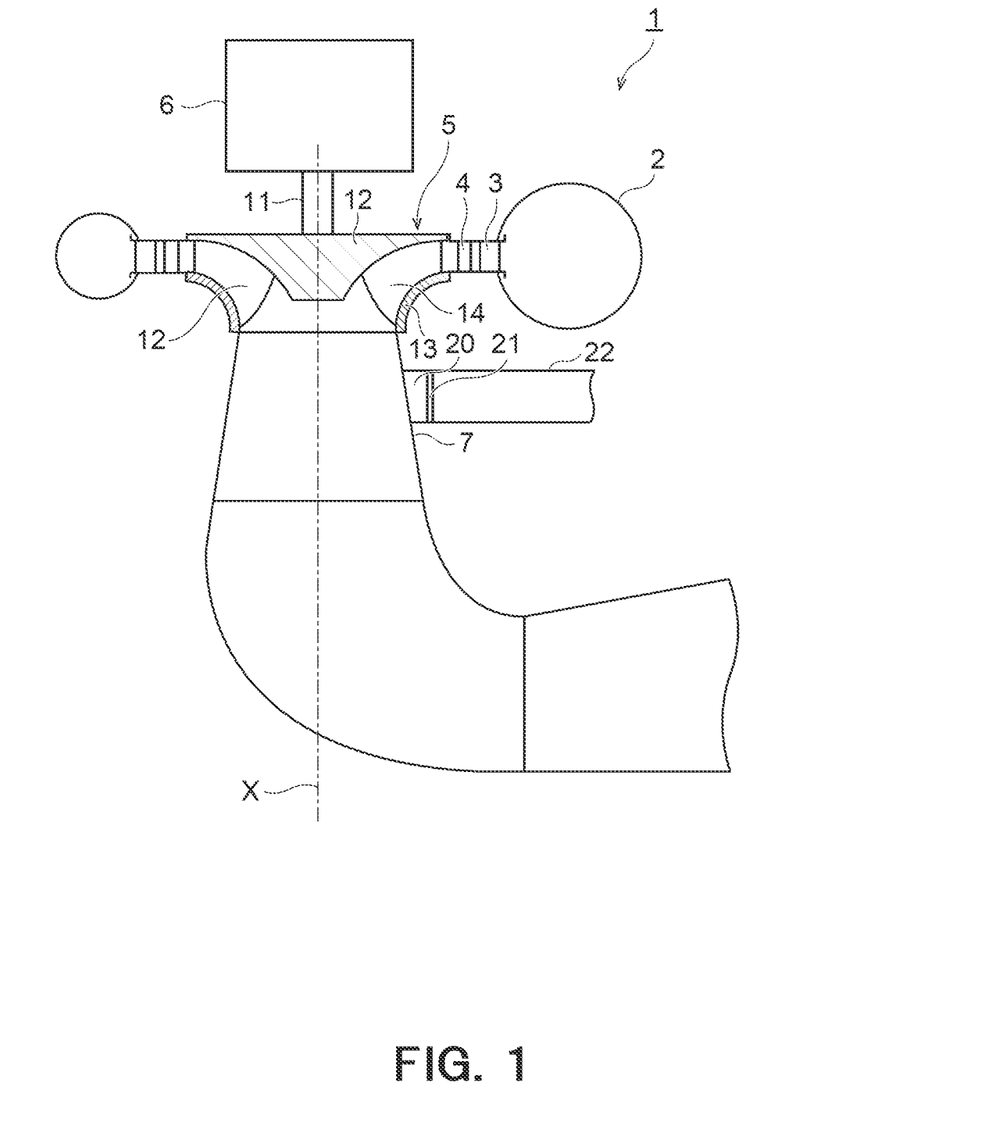
FIG. 1 is a meridian cross-sectional view of a Francis turbine according to an embodiment.

As illustrated in FIG. 1, a Francis turbine 1 includes a casing 2, a plurality of stay vanes 3, a plurality of guide vanes 4, a runner 5, a power generator 6 and a draft pipe 7.

The casing 2 is formed in a spiral shape, and is configured such that water flows thereinto from an upper pond through a hydraulic iron pipe (none of which are illustrated) and the water flows therein during turbine operation. As illustrated in FIG. 2, the casing 2 is provided with a maintenance hole 10. The maintenance hole 10 is covered with a maintenance hole cover 10a. At the time of maintenance of the Francis turbine 1, the maintenance hole cover 10a is removed to allow a worker to enter the inside of the casing 2 from the maintenance hole 10.

The stay vanes 3 are provided downstream of the casing 2. The stay vanes 3 are configured to guide water flowing into the casing 2 to the guide vanes 4. The stay vanes 3 are arranged at predetermined intervals in the circumferential direction. Between the stay vanes 3, flow paths through which water flows are formed.

The guide vanes 4 are provided downstream of the stay vanes 3. The guide vanes 4 are configured to guide water flowing in from the stay vanes 3 to the runner 5. The guide vanes 4 are arranged at predetermined intervals in the circumferential direction. Between the guide vanes 4, flow paths through which water flows are formed. Each of the guide vanes 4 is configured to be rotatable, and the flow rate of water guided to the runner 5 can be adjusted by changing the opening degree of each of the guide vanes 4 through rotation. A power generation amount of the power generator 6 described later can thus be adjusted.

The runner 5 is provided downstream of the guide vanes 4. The runner 5 is configured to be rotatable around a rotation axis X with respect to the casing 2, and is rotationally driven by water flowing in from the guide vanes 4. The runner 5 includes a crown 12 connected to a main shaft 11 (rotation shaft), a band 13 provided on an outer peripheral side of the crown 12 and a plurality of runner blades 14 provided between the crown 12 and the band 13. The runner blades 14 are arranged at predetermined intervals in the circumferential direction. Each of the runner blades 14 is joined to the crown 12 and the band 13. Between the runner blades 14, flow paths through which water flows are formed. Water from the guide vanes 4 flows through each flow path, and each of the runner blades 14 receives pressure from the water to rotationally drive the runner 5. The pressure energy of the water flowing into the runner 5 is thus converted into rotational energy.

Figure 2:
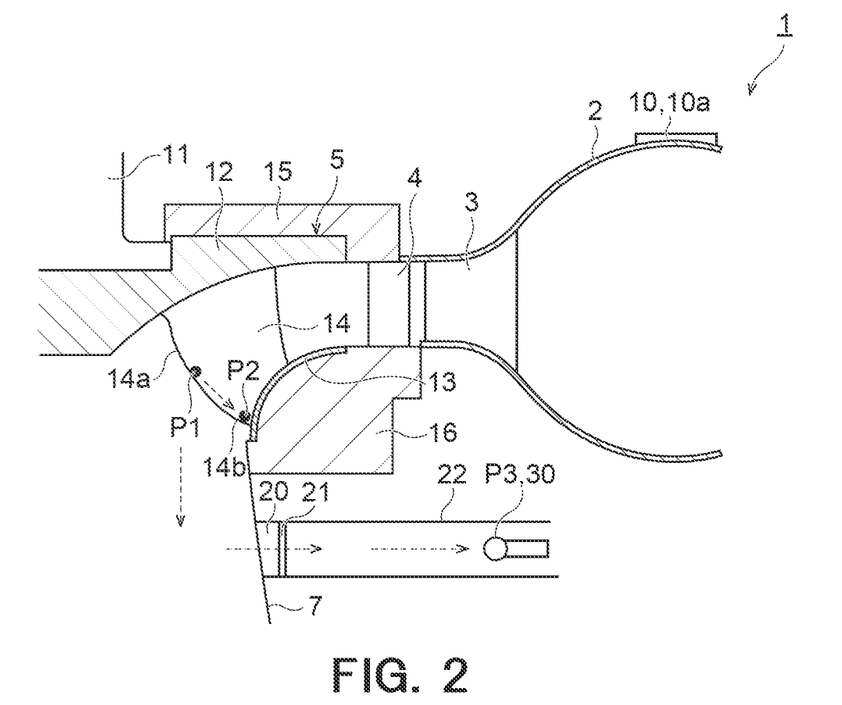
FIG. 2 is a partially enlarged cross-sectional view of FIG. 1.

As illustrated in FIG. 2, an upper cover 15 is provided above the runner 5. In other words, the upper portion of the runner 5 is covered with the upper cover 15. The upper cover 15 extends from an upper side of the guide vanes 4 to an upper side of the crown 12.

As illustrated in FIG. 2, a lower cover 16 is provided below the runner 5. In other words, the lower portion of the runner 5 is covered with the lower cover 16. The lower cover 16 extends from a lower side of the guide vanes 4 to a lower side of the band 13.

The power generator 6 is connected to the runner 5 via the main shaft 11. The power generator 6 is configured to generate power with the rotational energy of the runner 5 transmitted during turbine operation. Note that the power generator 6 may also be configured to have a function as an electric motor and rotationally drive the runner 5 with electric power supplied. In this case, the water in a lower pond can be pumped and discharged to the upper pond via the draft pipe 7 described later, and the Francis turbine 1 can be operated as a pump turbine (pumping operation). During this operation, the opening degree of the guide vanes 4 is changed according to the pump lift to obtain an appropriate pumped amount.

The draft pipe 7 is provided downstream of the runner 5. The draft pipe 7 is connected to the lower pond or a drainage channel which are not illustrated, and water having rotationally driven the runner 5 recovers pressure and is discharged to the lower pond or the drainage channel.

As illustrated in FIGS. 1 and 2, a maintenance hole 20 is provided on a wall surface of the draft pipe 7. As illustrated in FIG. 2, the maintenance hole 20 is provided in the vicinity of a runner blades outlet end 14a of the runner 5 and below the lower cover 16. The maintenance hole 20 is connected to the maintenance channel 22 from the inside of the draft pipe 7. The maintenance hole 20 is covered with a maintenance hole cover 21. At the time of maintenance of the Francis turbine 1, the maintenance hole cover 21 is removed to allow a worker to enter the inside of the draft pipe 7 through the maintenance channel 22.

In a case of carrying out the turbine operation in the Francis turbine 1 thus configured, water flows from the upper pond into the guide vanes 4 through the hydraulic iron pipe, the casing 2 and the stay vanes 3, and water flows from the guide vanes 4 into the runner 5. The water flowing into the runner 5 rotationally drives the runner 5. The runner 5 thus rotationally driven transmits rotational energy to the power generator 6 via the connected main shaft 11, and power is generated by the power generator 6. The water having flown into the runner 5 passes through the runner 5, then flows out to the draft pipe 7, and is discharged to the lower pond through the draft pipe 7.

Here, when water flows out of the runner 5, a Karman vortex may be generated on the downstream side of the runner blades outlet end 14a of the runner blades 14. The Karman vortex generates pressure pulsation in the draft pipe 7 to cause significant vibration and noise, and may generate stress concentrated on a runner blades root portion 14b. This stress may damage the runner blades 14 in the runner blades root portion 14b. In order to avoid such damage of the runner blades 14, it is important to determine stress Sb generated in the runner blades root portion 14b during the turbine operation of the Francis turbine 1.

Next, a stress estimation method for a machine structure as a first embodiment is described. The stress estimation method for a machine structure according to the present embodiment is a method of estimating stress generated at an evaluation target position in the machine structure during operation of the machine structure. Hereinafter, a method of estimating the stress generated in the runner blades root portion 14b during the turbine operation of the Francis turbine 1 using the stress estimation method for a machine structure according to the present embodiment is described.

The stress estimation method for a machine structure according to the present embodiment is provided with: an identification step of identifying an evaluation target frequency fr; a calculation step of calculating a relationship between stress Sa and sound pressure La during vibration; a detection step of detecting sound pressure Lb during operation; and an estimation step of estimating stress Sb during operation. The steps are described below.

First, the identification step is carried out. In the identification step, the evaluation target frequency fr is identified. The identification step includes a step of selecting a vibration phenomenon to be evaluated and a step of identifying the evaluation target frequency fr. In the step of selecting a vibration phenomenon to be evaluated, for example, a vibration phenomenon caused by a Karman vortex generated on the downstream side of the runner blades outlet end 14a described above can be selected as an evaluation target. In the step of identifying the evaluation target frequency fr, the main frequency vibration of the vibration phenomenon selected as the evaluation target is identified as the evaluation target frequency fr. For example, when the vibration phenomenon caused by the Karman vortex described above is selected as the evaluation target, the main frequency vibration of the Karman vortex can be calculated from the operation conditions such as the flow rate of the waterwheel. Here, the evaluation target frequency fr may be either a specific one frequency or a frequency band with a certain range width.

Subsequently, the calculation step is carried out. In this calculation step, the relationship between the stress Sa generated at the evaluation target position P2 and the sound pressure La generated at the detection position P3 during vibration of the vibration position P1 in the machine structure is calculated. More specifically, the ratio of the sound pressure La generated at the detection position P3 to the stress Sa generated at the evaluation target position P2 upon vibration of the vibration position P1 at the above-described evaluation target frequency fr is calculated. In other words, a stress-sound pressure transfer function H between the evaluation target position P2 and the detection position P3 at the evaluation target frequency fr is calculated. The transfer function H can be represented by the following equation (1).

[Math. 1]
$$H = \frac{L_a}{S_a} \quad (1)$$

The vibration position P1, the evaluation target position P2 and the detection position P3 can be provided at arbitrary positions. The evaluation target position P2 may be provided at a position different from the vibration position P1, or may be provided at the same position as the vibration position P1. The detection position P3 is provided at a position different from the vibration position P1 and the evaluation target position P2. For example, in a case where the above-described vibration phenomenon caused by the Karman vortex is to be evaluated, since the Karman vortex is generated in the vicinity of the runner blades outlet end 14a (on the downstream side of the runner blades outlet end 14a), the vibration position P1 can be provided at the runner blades outlet end 14a as illustrated in FIG. 2. In the example illustrated in FIG. 2, the vibration position P1 is provided at a central portion of the runner blades outlet end 14a. Furthermore, as illustrated in FIG. 2, the evaluation target position P2 can be provided at the runner blades root portion 14b where the stress caused by the Karman vortex is concentrated. In the example illustrated in FIG. 2, the evaluation target position P2 is provided at the runner blades root portion 14b on the band 13 side. As illustrated in FIG. 2, the detection position P3 can be provided in the maintenance channel 22 so that the sound pressure La caused by the pressure pulsation generated in the draft pipe 7 due to the Karman vortex can be detected. It is thus possible to calculate the relationship between the stress Sa generated at the evaluation target position P2 provided at the runner blades root portion 14b when the vibration position P1 provided at the runner blades outlet end 14a is vibrated by simulating the vibration phenomenon caused by the Karman vortex and the sound pressure La generated at the detection position P3 provided in the maintenance channel 22.

The relationship (transfer function H) between the stress Sa and the sound pressure La may also be calculated by computer simulation. In other words, the stress Sa generated at the evaluation target position P2 when the vibration position P1 is vibrated at the evaluation target frequency fr may be calculated by carrying out the frequency response analysis using a calculation model having the same structure as the Francis turbine 1 described above, and the sound pressure La generated at the detection position P3 may be calculated by combining the acoustic analysis. Here, in the frequency response analysis, a calculation model in which the inside is filled with water may be used, that simulates the turbine operation of the Francis turbine 1. Then, the relationship (transfer function H) between the stress Sa and the sound pressure La may be calculated by assigning the stress Sa and the sound pressure La thus calculated into the above equation (1).

Next, the detection step is carried out. In this detection step, the sound pressure Lb generated at the detection position P3 during operation of the machine structure is detected. The sound pressure Lb may be detected by the sound pressure sensor 30 such as a microphone. That is, as illustrated in FIG. 2, the sound pressure sensor 30 may be installed at the detection position P3 provided in the maintenance channel 22, and the sound pressure sensor 30 may detect the sound pressure Lb during the turbine operation of the Francis turbine 1. As described above, when the Karman vortex is generated, pressure pulsation occurs in the draft pipe 7, and significant noise may be generated. The sound pressure sensor 30 can detect the sound pressure Lb of the noise. More specifically, the sound pressure Lb at the above-described evaluation target frequency fr is detected. For example, the sound pressure Lb may also be obtained by carrying out noise measurement in a wide band (for example, 0 to 20 kHz) by the sound pressure sensor 30, then carrying out the FFT analysis on the measured data, and extracting the sound pressure Lb at the specific frequency fr from the frequency spectrum thus obtained. The sound pressure sensor 30 may be a sensor suitable for detecting the sound pressure at the evaluation target frequency fr. In other words, the sound pressure sensor 30 having high sensitivity at the evaluation target frequency fr may be used.

Thereafter, the estimation step is carried out. In this estimation step, the stress Sb generated at the evaluation target position P2 during operation of the machine structure is estimated on the basis of the relationship between the stress Sa and the sound pressure La calculated in the calculation step and the sound pressure Lb detected in the detection step. More specifically, the stress Sb at the above-described evaluation target frequency fr is estimated. As described above, the relationship (transfer function H) between the stress Sa generated at the evaluation target position P2 in the machine structure and the sound pressure La generated at the detection position P3 during vibration of the vibration position P1 can be represented by the above equation (1). On the other hand, a similar relationship is established between the stress Sb generated at the evaluation target position P2 and the sound pressure Lb generated at the detection position P3 when vibration is generated at the vibration position P1 in the machine structure. Therefore, the stress Sb generated at the evaluation target position P2 can be represented by the following equation (2).

[Math. 2]
$$S_b = \frac{L_b}{H} \quad (2)$$

The stress Sb generated at the evaluation target position P2 can be calculated by assigning the transfer function H calculated by the above equation (1) in the calculation step and the sound pressure Lb detected in the detection step into the above equation (2).

The stress Sb generated in the runner blades root portion 14b during the turbine operation of the Francis turbine 1 due to the vibration phenomenon caused by the Karman vortex can thus be estimated using the stress estimation method for a machine structure according to the present embodiment.

As described above, according to the present embodiment, the stress Sb generated at the evaluation target position P2 during operation of the machine structure can be estimated on the basis of: the relationship between the stress Sa generated at the evaluation target position P2 and the sound pressure La generated at the detection position P3 during vibration of the machine structure; and the sound pressure Lb generated at the detection position P3 during operation of the machine structure. As such, the stress Sb generated at the evaluation target position P2 during operation of the machine structure can be estimated from the sound pressure Lb generated at the detection position P3 during operation of the machine structure, by calculating in advance the relationship between the stress Sa generated at the evaluation target position P2 and the sound pressure La generated at the detection position P3 during vibration of the machine structure. Therefore, the state of the evaluation target position P2 in the machine structure during operation of the machine structure can be determined without shutting down the operation of the machine structure.

In addition, according to the present embodiment, the relationship between the stress Sa generated at the evaluation target position P2 and the sound pressure La generated at the detection position P3 during vibration of the machine structure is calculated by computer simulation. By thus using the computer simulation, the relationship between the stress Sa and the sound pressure La can be easily calculated without conducting an experiment. Furthermore, in the computer simulation, the relationship between the stress Sa and the sound pressure La can be calculated using a calculation model in which the inside is filled with water as in a waterwheel structure. Therefore, the relationship between the stress Sa and the sound pressure La can be calculated in a state similar to the state during operation, whereby the estimation accuracy of the stress Sb can be improved.

In addition, according to the present embodiment, the machine structure includes the runner 5 that rotates in response to pressure from a fluid, and the evaluation target position P2 is provided in the runner 5. As described above, in a case where the evaluation target position P2 is provided in a rotary device that rotates in response to pressure from a fluid during operation, it is difficult to attach the stress sensor such as a strain gauge to the evaluation target position P2. Furthermore, even if the stress sensor is to be attached, it is necessary to shut down the operation of the machine structure in order to attach the stress sensor, whereby an opportunity loss may occur due to the shutdown. On the other hand, according to the present embodiment, even in a case where the evaluation target position P2 is provided in such a rotary device, the stress Sb generated at the evaluation target position P2 during operation of the machine structure can be estimated. Therefore, the state of the evaluation target position P2 in the machine structure during operation of the machine structure can be determined without shutting down the operation of the machine structure.

According to the present embodiment, the machine structure is a waterwheel structure. In a case where the machine structure is a waterwheel structure as described above, it is difficult to attach the stress sensor inside the waterwheel structure during operation of the waterwheel structure. In addition, even if the stress sensor is to be attached, it is necessary to shut down the operation of the waterwheel structure in order to attach the stress sensor inside the waterwheel structure. In this case, an attaching operation of the stress sensor may take place after draining water out of the waterwheel structure, and the operation shutdown period of the waterwheel structure is extended and the maintenance/inspection work of the waterwheel structure increases, whereby an opportunity loss may occur due to the operation shutdown of the waterwheel structure. On the other hand, according to the present embodiment, the stress Sb generated at an arbitrary evaluation target position P2 of the waterwheel structure during the operation of the waterwheel structure can be estimated. Therefore, the state of the evaluation target position P2 in the machine structure during operation of the machine structure can be determined without shutting down the operation of the machine structure.

First Modification of First Embodiment

In the embodiment described above, an example has been described in which the stress Sb generated at the evaluation target position P2 during operation of the machine structure is estimated on the basis of: the relationship between the stress Sa generated at the evaluation target position P2 and the sound pressure La generated at the detection position P3 during vibration of the machine structure; and the sound pressure Lb generated at the detection position P3 during operation of the machine structure. However, limitation thereto is not intended, and the stress Sb generated at the evaluation target position P2 during operation of the machine structure may also be estimated on the basis of: the relationship between the stress Sa generated at the evaluation target position P2 and vibration Va generated at the detection position P3 during vibration of the machine structure; and vibration Vb generated at the detection position P3 during operation of the machine structure.

In this case, the relationship between the stress Sa generated at the evaluation target position P2 and the vibration Va generated at the detection position P3 during vibration of the vibration position P1 in the machine structure is calculated in the calculation step. More specifically, the ratio of the vibration Va generated at the detection position P3 to the stress Sa generated at the evaluation target position P2 upon vibration of the vibration position P1 at the above-described evaluation target frequency fr is calculated. In other words, a transfer function H of the stress and the vibration between the evaluation target position P2 and the detection position P3 at the evaluation target frequency fr is calculated. The transfer function H can be represented by the following equation (3).

[Math. 3]

$$H = \frac{V_a}{S_a} \quad (3)$$

Figure 3:
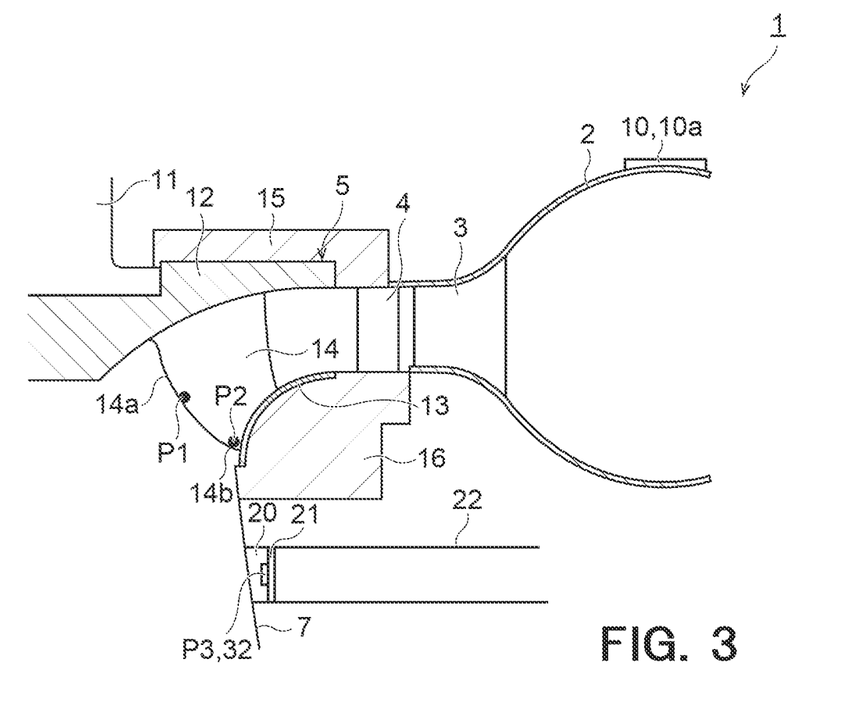
FIG. 3 is a modification of FIG. 2.

Here, the detection position P3 can be provided at any position in the machine structure as long as vibration generated during operation of the machine structure can be detected. For example, as illustrated in FIG. 3, the detection position P3 may be provided on the maintenance hole cover 21.

The relationship (transfer function H) between the stress Sa and the vibration Va may also be calculated by computer simulation. In other words, the stress Sa generated at the evaluation target position P2 and the vibration Va generated at the detection position P3 when the vibration position P1 is vibrated at the evaluation target frequency fr may be calculated by carrying out the frequency response analysis using a calculation model having the same structure as the Francis turbine 1 described above. Here, in the frequency response analysis, a calculation model in which the inside is filled with water may be used, that simulates the turbine operation of the Francis turbine 1. Then, the relationship (transfer function H) between the stress Sa and the vibration Va may be calculated by assigning the stress Sa and the vibration Va thus calculated into the above equation (3).

In addition, in the detection step, the vibration Vb generated at the detection position P3 during operation of the machine structure is detected. The vibration Vb may be detected by a vibration sensor 32 such as an acceleration sensor. That is, as illustrated in FIG. 3, the vibration sensor 32 may be installed at the detection position P3 provided on the maintenance hole cover 21, and the vibration sensor 32 may detect the vibration Vb during the turbine operation of the Francis turbine 1. As described above, when the Karman vortex is generated, pressure pulsation occurs in the draft pipe 7, and significant vibration may be generated. The vibration sensor 32 can detect the vibration Vb. More specifically, the vibration Vb at the above-described evaluation target frequency fr is detected. For example, the vibration Vb may also be obtained by carrying out vibration measurement in a wide band (for example, 0 to 20 kHz) by the vibration sensor 32, then carrying out the FFT analysis on the measured data, and extracting the vibration Vb at the specific frequency fr from the frequency spectrum thus obtained. The vibration sensor 32 may be a sensor suitable for detecting the vibration at the evaluation target frequency fr. In other words, the vibration sensor 32 having high sensitivity at the evaluation target frequency fr may be used.

In addition, in the estimation step, the stress Sb generated at the evaluation target position P2 during operation of the machine structure is estimated on the basis of the relationship between the stress Sa and the vibration Va calculated in the calculation step and the vibration Vb detected in the detection step. More specifically, the stress Sb at the above-described evaluation target frequency fr is estimated. As described above, the relationship (transfer function H) between the stress Sa generated at the evaluation target position P2 in the machine structure and the vibration Va generated at the detection position P3 during vibration of the vibration position P1 can be represented by the above equation (3). On the other hand, a similar relationship is established between the stress Sb generated at the evaluation target position P2 and the vibration Vb generated at the detection position P3 when vibration is generated at the vibration position P1 in the machine structure. Therefore, the stress Sb generated at the evaluation target position P2 can be represented by the following equation (4).

[Math. 4]

$$S_b = \frac{V_b}{H} \quad (4)$$

The stress Sb generated at the evaluation target position P2 can be calculated by assigning the transfer function H calculated by the above equation (3) in the calculation step and the vibration Vb detected in the detection step into the above equation (4).

The stress Sb generated in the runner blades root portion 14b during the turbine operation of the Francis turbine 1 due to the vibration phenomenon caused by the Karman vortex can thus be estimated using the stress estimation method for a machine structure according to the present modification.

As described above, according to the present modification, the stress Sb generated at the evaluation target position P2 during operation of the machine structure can be estimated on the basis of: the relationship between the stress Sa generated at the evaluation target position P2 and the vibration Va generated at the detection position P3 during vibration of the machine structure; and the vibration Vb generated at the detection position P3 during operation of the machine structure. As such, the stress Sb generated at the evaluation target position P2 during operation of the machine structure can be estimated on the basis of: the relationship between the stress Sa generated at the evaluation target position P2 and a physical quantity including the sound pressure La or the vibration Va generated at the detection position P3 during vibration of the machine structure; and the physical quantity generated at the detection position P3 during operation of the machine structure.

In addition, according to the present modification, it is possible to eliminate a calculation error caused by carrying out the acoustic analysis on a portion where the sound pressure propagates in the air, whereby the estimation accuracy of the stress Sb can be improved.

Second Modification of First Embodiment

In the above-described embodiment, an example has been described in which the relationship between the stress Sa and the sound pressure La is calculated by computer simulation. However, limitation thereto is not intended, and the relationship between the stress Sa and the sound pressure La may be calculated by a vibration experiment.

In this case, in the calculation step, for example when the Francis turbine 1 is shut down, a worker may enter the inside of the Francis turbine 1 through the maintenance hole 10 provided in the casing 2 or the maintenance hole 20 provided in the draft pipe 7, attach the stress sensor such as a strain gauge to the evaluation target position P2 provided in the runner blades root portion 14b, and vibrate the vibration position P1 provided at the runner blades outlet end 14a with a hammer or a shaker to obtain the stress Sa generated at the evaluation target position P2 and the sound pressure La generated at the detection position P3. Then, the relationship (transfer function H) between the stress Sa and the sound pressure La may be calculated by assigning the stress Sa and the sound pressure La thus obtained into the above equation (1).

The relationship between the stress Sa and the sound pressure La can be calculated by such a vibration experiment instead of the computer simulation.

According to the present modification, the relationship between the stress Sa and the sound pressure La can be calculated without carrying out the computer simulation. In addition, a calculation error caused by the computer simulation can be eliminated, whereby the estimation accuracy of the stress Sb can be improved.

Third Modification of First Embodiment

Alternatively, in the above-described embodiment, the relationship between the stress Sa and the sound pressure La may also be calculated by a combination of the computer simulation and the vibration experiment.

Figure 4:
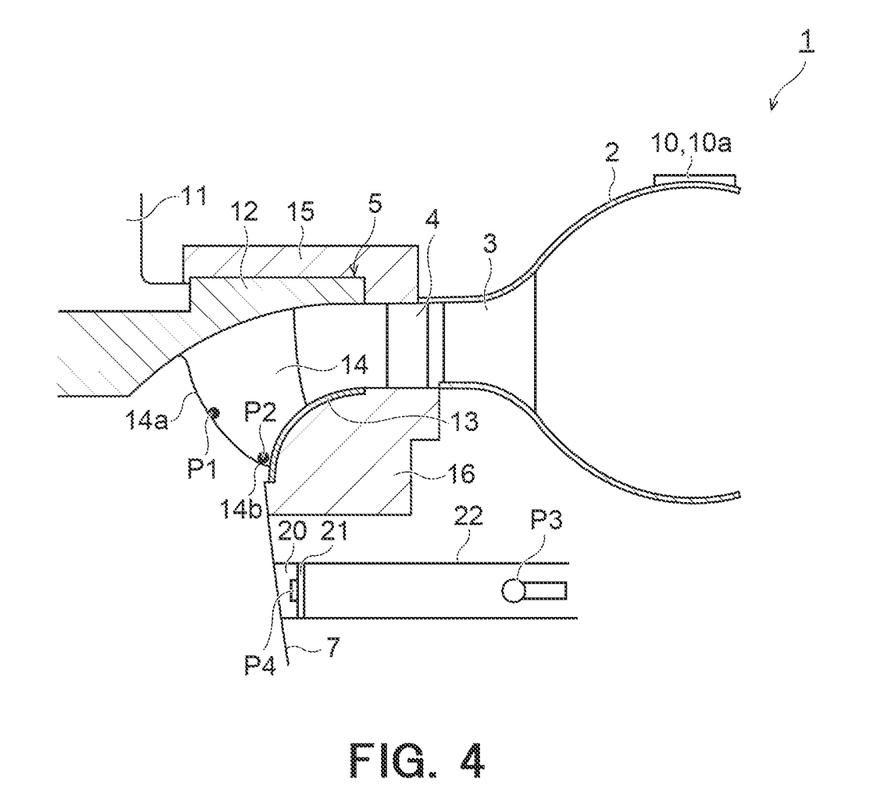
FIG. 4 is a modification of FIG. 2.

In this case, in the calculation step, for example as illustrated in FIG. 4, the stress Sa generated at the evaluation target position P2 provided in the runner blades root portion 14b and the stress Sm generated at a relay position P4 provided on the maintenance hole cover 21 during vibration of the vibration position P1 provided at the runner blades outlet end 14a are calculated by the computer simulation. The transfer function H1 between the evaluation target position P2 and the relay position P4 can thus be obtained. In addition, the sound pressure Lm generated at the detection position P3 provided in the maintenance channel 22 during vibration of the relay position P4 is obtained by the vibration experiment. A transfer function H2 between the relay position P4 and the detection position P3 can thus be obtained. The transfer function H between the evaluation target position P2 and the detection position P3 can be obtained by multiplying the transfer function H1 obtained by the computer simulation by the transfer function H2 obtained by the vibration experiment.

By thus combining the computer simulation and the vibration experiment, the relationship between the stress Sa and the sound pressure La can be calculated.

According to the present modification, the calculation accuracy can be improved by carrying out the computer simulation for the portion of the waterwheel structure of which the interior is filled with water, and the calculation error can be eliminated by carrying out the vibration experiment for the portion where the sound pressure propagates in the air. The estimation accuracy of the stress Sb can thus be further improved.

Other Modifications of First Embodiment

In the above-described embodiment, an example in which the evaluation target position P2 is provided in the runner 5 has been described. However, limitation thereto is not intended, and the evaluation target position P2 may be provided at an arbitrary position. For example, the evaluation target position P2 may be provided in the stay vanes 3 or the guide vanes 4. In this case, the stress generated in the stay vanes 3 and the guide vanes 4 during the turbine operation of the Francis turbine 1 can be calculated. The vibration position P1 may also be provided at a position other than the runner 5. In this case, a vibration phenomenon other than the vibration phenomenon caused by the Karman vortex can be subjected to an evaluation. In addition, the detection position P3 may also be provided at another arbitrary position, as long as the sound pressure and the vibration caused by the vibration phenomenon can be detected.

In addition, in the above-described embodiment, an example in which the machine structure is a waterwheel structure has been described. However, limitation thereto is not intended, and the machine structure may be a turbine structure such as a steam turbine or a gas turbine. In this case, the vibration position P1 and the evaluation target position P2 may be provided in the rotary device of the turbine structure. Furthermore, the machine structure is not limited to a waterwheel structure or a turbine structure, and may be another arbitrary machine structure.

Second Embodiment

Next, a monitoring method for a machine structure as a second embodiment is described.

The second embodiment is primarily different from the first embodiment in that the monitoring method for a machine structure is provided with a determination step of determining a notification threshold value of the sound pressure during operation of the machine structure on the basis of the relationship calculated in the calculation step and allowable stress of the evaluation target position having been set; and a notification step of notifying that the sound pressure detected in the detection step has exceeded the notification threshold value, and other configurations are substantially the same as those of the first embodiment illustrated in FIGS. 1 to 4. Note that in the second embodiment, the same components as those of the first embodiment illustrated in FIGS. 1 to 4 are denoted by the same reference numerals, and detailed description thereof is omitted.

The monitoring method for a machine structure according to the present embodiment is a method of monitoring a state of an evaluation target position in the machine structure during operation of the machine structure. Hereinafter, a method of monitoring a state of the runner blades root portion 14b during the turbine operation of the Francis turbine 1 using the monitoring method for a machine structure according to the present embodiment is described.

The monitoring method for a machine structure according to the present embodiment is provided with: an identification step of identifying an evaluation target frequency fr; a calculation step of calculating a relationship between stress Sa and sound pressure La during vibration; a determination step of determining a notification threshold value Lt of the sound pressure during operation; a detection step of detecting sound pressure Lb during operation; and a notification step of notifying that the sound pressure Lb during operation has exceeded the notification threshold value Lt. The steps are described below.

First, the identification step is carried out. In the identification step, the evaluation target frequency fr is identified. Here as well, in a similar manner to the first embodiment described above, main frequency vibration of the vibration phenomenon caused by the Karman vortex generated on the downstream side of the runner blades outlet end 14a can be identified as the evaluation target frequency fr.

Subsequently, the calculation step is carried out. In this calculation step, the relationship between the stress Sa generated at the evaluation target position P2 and the sound pressure La generated at the detection position P3 during vibration of the vibration position P1 in the machine structure is calculated. Here as well, in a similar manner to the first embodiment described above, the stress-sound pressure transfer function H between the evaluation target position P2 and the detection position P3 at the evaluation target frequency fr can be calculated by the above equation (1). In addition, in a similar manner to the first embodiment described above, the vibration position P1 can be provided at the runner blades outlet end 14a, the evaluation target position P2 can be provided at the runner blades root portion 14b, and the detection position P3 can be provided in the maintenance channel 22 (see FIG. 2). Furthermore, in a similar manner to the first embodiment described above, the relationship between the stress Sa and the sound pressure La (transfer function H) may be calculated by computer simulation.

Next, the determination step is carried out. In this determination step, the notification threshold value Lt of the sound pressure during operation of the machine structure is determined on the basis of the relationship calculated in the calculation step and allowable stress Sc of the evaluation target position P2 having been set. More specifically, the allowable stress Sc at the evaluation target position P2 at the evaluation target frequency fr described above is set, and the notification threshold value Lt of the sound pressure at the evaluation target frequency fr is determined. Here, the allowable stress Sc means the maximum allowable stress allowed to occur at the evaluation target position P2 of the machine structure. In a case where the evaluation target position P2 is provided in the runner blades root portion 14b, the allowable stress Sc is the maximum allowable stress allowed to occur in the runner blades root portion 14b, and is a design value determined by the type and material of the runner blades 14. In order to avoid damage of the runner blades 14, the Francis turbine 1 is required to operate so that the stress generated in the runner blades root portion 14*b* does not exceed the allowable stress Sc. The notification threshold value Lt of the sound pressure can be represented by the following equation (5).

[Math. 5]

$$L_t = HS_c \quad (5)$$

The notification threshold value Lt of the sound pressure can be calculated by assigning the transfer function H calculated by the above equation (1) in the calculation step and the allowable stress Sc at the evaluation target position P2 into the above equation (5). The notification threshold value Lt corresponds to the sound pressure generated at the detection position P3 when the stress equal to the allowable stress Sc is generated at the evaluation target position P2, and therefore, detection of the sound pressure exceeding the notification threshold value Lt at the detection position P3 means that the stress exceeding the allowable stress Sc is generated at the evaluation target position P2.

Thereafter, the detection step is carried out. In this detection step, the sound pressure Lb generated at the detection position P3 during operation of the machine structure is detected. Here as well, in a similar manner to the first embodiment described above, the sound pressure sensor 30 may be installed at the detection position P3 provided in the maintenance channel 22, and the sound pressure sensor 30 may detect the sound pressure Lb during the turbine operation of the Francis turbine 1 (see FIG. 2). More specifically, the sound pressure Lb at the above-described evaluation target frequency fr is detected.

Then, the notification step is carried out. In this notification step, notification is made that the sound pressure Lb detected in the detection step has exceeded the notification threshold value Lt. The notification step may take place simultaneously with the detection step. More specifically, the notification step may take place while the sound pressure Lb is detected in the detection step, when the detected sound pressure Lb exceeds the notification threshold value Lt. Here, the sound pressure Lb and the notification threshold value Lt are compared at the above-described evaluation target frequency fr, and when the sound pressure Lb exceeds the notification threshold value Lt, notification of the fact is made. The notification can be made in various modes. For example, notification can be made by a method of displaying a warning on a display device, sounding an alarm, or the like. With this notification, it can be estimated that the stress Sb exceeding the allowable stress Sc is generated at the evaluation target position P2 during operation of the machine structure. A worker can thus take measures such as shutting down the operation and changing the operating condition of the machine structure.

As described above, according to the present embodiment, the notification threshold value Lt of the sound pressure during operation of the machine structure can be determined on the basis of: the relationship between the stress Sa generated at the evaluation target position P2 and the sound pressure La generated at the detection position P3 during vibration of the machine structure; and the allowable stress Sc at the evaluation target position P2 having been set. Consequently, notification is made that the sound pressure La generated at the detection position P3 during operation of the machine structure has exceeded the notification threshold value Lt, and it is possible to estimate that the stress exceeding the allowable stress Sc is generated at the evaluation target position P2 during operation of the machine structure. Therefore, the state of the evaluation target position P2 in the machine structure during operation of the machine structure can be determined without shutting down the operation of the machine structure. As a result, a worker can take measures such as shutting down the operation and changing the operating condition of the machine structure, whereby damage of the machine structure at the evaluation target position can be avoided.

In addition, according to the present embodiment, the relationship between the stress Sa generated at the evaluation target position P2 and the sound pressure La generated at the detection position P3 during vibration of the machine structure is calculated by computer simulation. By thus using the computer simulation, the relationship between the stress Sa and the sound pressure La can be easily calculated without conducting an experiment. Furthermore, in the computer simulation, the relationship between the stress Sa and the sound pressure La can be calculated using a calculation model in which the inside is filled with water as in a waterwheel structure. Therefore, the relationship between the stress Sa and the sound pressure La can be calculated in a state similar to the state during operation, whereby the estimation accuracy of the stress Sb can be improved.

In addition, according to the present embodiment, the machine structure includes the runner 5 that rotates in response to pressure from a fluid, and the evaluation target position P2 is provided in the runner 5. As described above, in a case where the evaluation target position P2 is provided in a rotary device that rotates in response to pressure from a fluid during operation, it is difficult to attach the stress sensor such as a strain gauge to the evaluation target position P2. Furthermore, even if the stress sensor is to be attached, it is necessary to shut down the operation of the machine structure in order to attach the stress sensor, whereby an opportunity loss may occur due to the shutdown. On the other hand, according to the present embodiment, even in a case where the evaluation target position P2 is provided in such a rotary device, it can be determined that stress exceeding the allowable stress Sc is generated at the evaluation target position P2 during operation of the machine structure. Therefore, the state of the evaluation target position P2 in the machine structure during operation of the machine structure can be determined without shutting down the operation of the machine structure.

According to the present embodiment, the machine structure is a waterwheel structure. In a case where the machine structure is a waterwheel structure as described above, it is difficult to attach the stress sensor inside the waterwheel structure during operation of the waterwheel structure. In addition, even if the stress sensor is to be attached, it is necessary to shut down the operation of the waterwheel structure in order to attach the stress sensor inside the waterwheel structure. In this case, an attaching operation of the stress sensor may take place after draining water out of the waterwheel structure, and the operation shutdown period of the waterwheel structure is extended and the maintenance/inspection work of the waterwheel structure increases, whereby an opportunity loss may occur due to the operation shutdown of the waterwheel structure. On the other hand, according to the present embodiment, it can be determined that stress exceeding the allowable stress Sc is generated at the evaluation target position P2 during operation of the waterwheel structure. Therefore, the state of the evaluation target position P2 in the machine structure during operation of the machine structure can be determined without shutting down the operation of the machine structure.

First Modification of Second Embodiment

In the present embodiment described above, an example has been described in which the notification threshold value Lt of the sound pressure during operation of the machine structure is determined on the basis of: the relationship between the stress Sa generated at the evaluation target position P2 and the sound pressure La generated at the detection position P3 during vibration of the machine structure; and the allowable stress Sc at the evaluation target position P2 having been set. However, limitation thereto is not intended, and a notification threshold value Vt of the vibration during operation of the machine structure may also be determined on the basis of: the relationship between the stress Sa generated at the evaluation target position P2 and the vibration Va generated at the detection position P3 during vibration of the machine structure; and the allowable stress Sc at the evaluation target position P2 having been set.

In this case, the relationship between the stress Sa generated at the evaluation target position P2 and the vibration Va generated at the detection position P3 during vibration of the vibration position P1 in the machine structure is calculated in the calculation step. Here as well, in a similar manner to the first modification of the first embodiment described above, the stress-vibration transfer function H between the evaluation target position P2 and the detection position P3 at the evaluation target frequency fr can be calculated by the above equation (3). In addition, in a similar manner to the first modification of the first embodiment described above, the detection position P3 can be provided on the maintenance hole cover 21 (see FIG. 3). Furthermore, in a similar manner to the first modification of the first embodiment described above, the relationship between the stress Sa and the vibration Va (transfer function H) may be calculated by computer simulation.

In addition, in the determination step, the notification threshold value Vt of the vibration during operation of the machine structure is determined on the basis of the relationship calculated in the calculation step and allowable stress Sc of the evaluation target position P2 having been set. More specifically, the allowable stress Sc at the evaluation target position P2 at the evaluation target frequency fr described above is set, and the notification threshold value Vt of the vibration at the evaluation target frequency fr is determined. The notification threshold value Vt of the vibration can be represented by the following equation (6).

[Math. 6]

$$V_t = HS_c \quad (6)$$

The notification threshold value Vt of the vibration can be calculated by assigning the transfer function H calculated by the above equation (3) in the calculation step and the allowable stress Sc at the evaluation target position P2 into the above equation (6). The notification threshold value Vt corresponds to the vibration generated at the detection position P3 when the stress equal to the allowable stress Sc is generated at the evaluation target position P2, and therefore, detection of the vibration exceeding the notification threshold value Vt at the detection position P3 means that the stress exceeding the allowable stress Sc is generated at the evaluation target position P2.

In addition, in the detection step, the vibration Vb generated at the detection position P3 during operation of the machine structure is detected. Here as well, in a similar manner to the first modification of the first embodiment described above, the vibration sensor 32 may be installed at the detection position P3 provided on the maintenance hole cover 21, and the vibration sensor 32 may detect the vibration Vb during the turbine operation of the Francis turbine 1 (see FIG. 3). More specifically, the vibration Vb at the above-described evaluation target frequency fr is detected.

In addition, in the notification step, notification is made that the vibration Vb detected in the detection step has exceeded the notification threshold value Vt. The notification step may take place simultaneously with the detection step. More specifically, the notification step may take place while the vibration Vb is detected in the detection step, when the detected vibration Vb exceeds the notification threshold value Vt. Here, the vibration Vb and the notification threshold value Vt are compared at the above-described evaluation target frequency fr, and when the vibration Vb exceeds the notification threshold value Vt, notification of the fact is made. With this notification, it can be estimated that the stress Sb exceeding the allowable stress Sc is generated at the evaluation target position P2 during operation of the machine structure.

As described above, according to the present modification, the notification threshold value Vt of the vibration during operation of the machine structure can be determined on the basis of: the relationship between the stress Sa generated at the evaluation target position P2 and the vibration Va generated at the detection position P3 during vibration of the machine structure; and the allowable stress Sc at the evaluation target position P2 having been set. Consequently, notification is made that the vibration Vb generated at the detection position P3 during operation of the machine structure has exceeded the notification threshold value Vt, and it is possible to estimate that the stress exceeding the allowable stress Sc is generated at the evaluation target position P2 during operation of the machine structure. Therefore, the state of the evaluation target position P2 in the machine structure during operation of the machine structure can be determined without shutting down the operation of the machine structure. In this manner, the notification threshold values Lt and Vt of the physical quantity at the time of operating the machine structure can be determined based on the relationship with the physical quantity including the sound pressure La or the vibration Va generated at the evaluation target position P2 at the time of vibrating the machine structure and the set allowable stress Sc of the evaluation target position P2.

In addition, according to the present modification, it is possible to eliminate a calculation error caused by carrying out the acoustic analysis on a portion where the sound pressure propagates in the air, whereby the estimation accuracy of the stress Sb can be improved.

Second Modification of Second Embodiment

In the above-described embodiment, an example has been described in which the relationship between the stress Sa and the sound pressure La is calculated by computer simulation. However, limitation thereto is not intended, and in a similar manner to the second modification of the first embodiment described above, the relationship between the stress Sa and the sound pressure La may be calculated by a vibration experiment.

According to the present modification, the relationship between the stress Sa and the sound pressure La can be calculated without carrying out the computer simulation. In addition, a calculation error caused by the computer simulation can be eliminated, whereby the estimation accuracy of the stress Sb can be improved.

Third Modification of Second Embodiment

Alternatively, in the above-described embodiment, the relationship between the stress Sa and the sound pressure La may also be calculated by a combination of the computer simulation and the vibration experiment, in a similar manner to the third modification of the first embodiment described above.

According to the present modification, the calculation accuracy can be improved by carrying out the computer simulation for the portion of the waterwheel structure of which the interior is filled with water, and the calculation error can be eliminated by carrying out the vibration experiment for the portion where the sound pressure propagates in the air. The estimation accuracy of the stress Sb can thus be further improved.

Other Modifications of Second Embodiment

In the above-described embodiment, an example in which the evaluation target position P2 is provided in the runner 5 has been described. However, limitation thereto is not intended, and the evaluation target position P2 may be provided at an arbitrary position. For example, the evaluation target position P2 may be provided in the stay vanes 3 or the guide vanes 4. In this case, states of the stay vanes 3 and the guide vanes 4 can be monitored during the turbine operation of the Francis turbine 1. The vibration position P1 may also be provided at a position other than the runner 5. In this case, a vibration phenomenon other than the vibration phenomenon caused by the Karman vortex can be subjected to an evaluation. In addition, the detection position P3 may also be provided at another arbitrary position, as long as the sound pressure and the vibration caused by the vibration phenomenon can be detected.

In addition, in the above-described embodiment, an example in which the machine structure is a waterwheel structure has been described. However, limitation thereto is not intended, and the machine structure may be a turbine structure such as a steam turbine or a gas turbine. In this case, the vibration position P1 and the evaluation target position P2 may be provided in the rotary device of the turbine structure. Furthermore, the machine structure is not limited to a waterwheel structure or a turbine structure, and may be another arbitrary machine structure.

According to the embodiments described above, the state of the evaluation target position in the machine structure during operation of the machine structure can be determined without shutting down the operation of the machine structure.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A stress estimation method for a machine structure, the machine structure including a rotary device that rotates in response to pressure from a fluid, the method estimating stress generated at an evaluation target position provided in the rotary device of the machine structure during operation of the machine structure, the method comprising:
    a calculation step of calculating a relationship between the stress generated at the evaluation target position and a physical quantity including a sound pressure or vibration generated at a detection position located away from the rotary device during vibration of the machine structure;
    a detection step of detecting the physical quantity generated at the detection position during operation of the machine structure; and
    an estimation step of estimating the stress generated at the evaluation target position during operation of the machine structure on the basis of the relationship calculated in the calculation step and the physical quantity detected in the detection step.

2. The stress estimation method for a machine structure according to claim 1, wherein the relationship in the calculation step is calculated by computer simulation.

3. The stress estimation method for a machine structure according to claim 1, wherein the relationship in the calculation step is calculated by a vibration experiment.

4. The stress estimation method for a machine structure according to claim 1, wherein the relationship in the calculation step is calculated by a combination of computer simulation and a vibration experiment.

5. The stress estimation method for a machine structure according to claim 1, wherein the machine structure is a waterwheel structure.

6. A monitoring method for a machine structure, the machine structure including a rotary device that rotates in response to pressure from a fluid, the method monitoring a state of an evaluation target position provided in the rotary device of the machine structure during operation of the machine structure, the method comprising:
    a calculation step of calculating a relationship between the stress generated at the evaluation target position and a physical quantity including a sound pressure or vibration generated at a detection position located away from the rotary device during vibration of the machine structure;
    a determination step of determining a notification threshold value of the physical quantity during operation of the machine structure on the basis of the relationship calculated in the calculation step and allowable stress of the evaluation target position having been set;
    a detection step of detecting the physical quantity generated at the detection position during operation of the machine structure; and
    a notification step of notifying that the physical quantity detected in the detection step has exceeded the notification threshold value.

7. The monitoring method for a machine structure according to claim 6, wherein the relationship in the calculation step is calculated by computer simulation.

8. The monitoring method for a machine structure according to claim 6, wherein the relationship in the calculation step is calculated by a vibration experiment.

9. The monitoring method for a machine structure according to claim 6 wherein the relationship in the calculation step is calculated by a combination of computer simulation and a vibration experiment.

10. The monitoring method for a machine structure according to claim 6, wherein the machine structure is a waterwheel structure.

\* \* \* \* \*